US011818648B2

(12) United States Patent
Chowta et al.

(10) Patent No.: US 11,818,648 B2
(45) Date of Patent: Nov. 14, 2023

(54) APPARATUS, METHOD AND COMPUTER PROGRAM FOR ROUTING DATA IN A DUAL OR MULTI-CONNECTIVITY CONFIGURATION

(71) Applicant: Nokia Solutions and Networks Oy, Espoo (FI)

(72) Inventors: Udaya Raju Chowta, Ulm (DE); Bertold Dickhaus, Olpe (DE); Fahad Syed Muhammad, Orsay (FR); Afef Feki, Sceaux (FR); Veronique Capdevielle, Magny les Hameaux (FR)

(73) Assignee: Nokia Solutions and Networks Oy, Espoo (FI)

( * ) Notice: Subject to any disclaimer, the term of this patent is extended or adjusted under 35 U.S.C. 154(b) by 106 days.

(21) Appl. No.: 17/203,875

(22) Filed: Mar. 17, 2021

(65) Prior Publication Data
US 2021/0297928 A1 Sep. 23, 2021

(30) Foreign Application Priority Data

Mar. 23, 2020 (EP) .................................... 20164790

(51) Int. Cl.
*H04W 40/32* (2009.01)
*H04W 76/15* (2018.01)
(Continued)

(52) U.S. Cl.
CPC ............ *H04W 40/32* (2013.01); *G06N 20/00* (2019.01); *H04W 76/15* (2018.02); *H04W 80/02* (2013.01); *H04W 84/18* (2013.01); *H04W 92/20* (2013.01)

(58) Field of Classification Search
None
See application file for complete search history.

(56) References Cited

U.S. PATENT DOCUMENTS 11,206,549 B1 * 12/2021 Eyuboglu ............. H04W 36/06
11,375,527 B1 * 6/2022 Eyuboglu ............. H04B 7/155
(Continued)

FOREIGN PATENT DOCUMENTS

WO 2019/137721 A1 7/2019

OTHER PUBLICATIONS

"3rd Generation Partnership Project;Technical Specification Group Radio Access Network;E-UTRA (Evolved Universal Terrestrial Radio Access)—NR Dual Connectivity (EN-DC) of LTE 1 Down Link (DL) / 1 Up Link (UL) and 1 NR band (Release 15)", 3GPP TR 37.863-01-01, V15.3.0, Jun. 2019, pp. 1-450.
(Continued)

*Primary Examiner* — Gregory B Sefcheck
*Assistant Examiner* — Suk Jin Kang
(74) *Attorney, Agent, or Firm* — Joseph C. Drish; Harrington & Smith

(57) ABSTRACT

An apparatus comprises means for performing, at a CU of a master node: receiving an individual PDU from one or more incoming PDUs, wherein each PDU is to be transmitted to a UE via one amongst respective paths towards at least one DU of the master node and at least one secondary node, the UE being in DC or MC with the master node and the at least one secondary node; collecting a respective data set for each of the paths; receiving, from a ML model inputting each data set, a respective estimated delay of transmission for each of the paths; selecting, from each of the paths, a path based on the estimated delay of transmission; and transmitting the PDU to the UE via the selected path.

24 Claims, 16 Drawing Sheets

(51) Int. Cl.
*G06N 20/00* (2019.01)
*H04W 80/02* (2009.01)
*H04W 84/18* (2009.01)
*H04W 92/20* (2009.01)

(56) References Cited

U.S. PATENT DOCUMENTS

| | | | | |
|---|---|---|---|---|
| 2015/0319076 | A1* | 11/2015 | Vasseur | H04L 45/124 370/238 |
| 2015/0319077 | A1* | 11/2015 | Vasseur | H04L 45/44 370/238 |
| 2015/0332165 | A1* | 11/2015 | Mermoud | H04L 41/147 706/12 |
| 2018/0206173 | A1* | 7/2018 | Virtej | H04W 40/02 |
| 2019/0097912 | A1* | 3/2019 | Salam | G06N 3/08 |
| 2019/0220703 | A1* | 7/2019 | Prakash | G06V 10/95 |
| 2020/0092181 | A1* | 3/2020 | Thiagarajan | H04L 43/062 |
| 2020/0274641 | A1* | 8/2020 | Liu | H04L 1/0018 |
| 2020/0342291 | A1* | 10/2020 | Croxford | G06F 9/5055 |
| 2020/0374955 | A1* | 11/2020 | Dudda | H04W 76/15 |
| 2020/0383030 | A1* | 12/2020 | Cho | H04L 45/26 |
| 2021/0012239 | A1* | 1/2021 | Arzani | H04L 43/50 |
| 2021/0105640 | A1* | 4/2021 | Hong | H04L 5/001 |
| 2021/0258903 | A1* | 8/2021 | Suzuki | H04W 56/004 |
| 2021/0258969 | A1* | 8/2021 | Yang | H04W 72/54 |
| 2021/0360475 | A1* | 11/2021 | Wittberg | H04W 28/085 |
| 2022/0078099 | A1* | 3/2022 | Zhohov | H04L 41/16 |

OTHER PUBLICATIONS

"3rd Generation Partnership Project;Technical Specification Group Radio Access Network;Evolved Universal Terrestrial Radio Access Network (E-UTRAN); Extension of dual connectivity in E-UTRAN(Release 13)", 3GPP TR 36.875, V13.1.0, Sep. 2015, pp. 1-37.

"3rd Generation Partnership Project;Technical Specification Group Radio Access Network;NG-RAN; NR user plane protocol (Release 15)", 3GPP TS 38.425, V1.0.0, Dec. 2017, pp. 1-16.

"3rd Generation Partnership Project;Technical Specification Group Radio Access Network;Evolved Universal Terrestrial Radio Access Network(E-UTRAN); X2 application protocol (X2AP)(Release 15)", 3GPP TS 36.423, V15.7.0. Sep. 2019, pp. 1-422.

"3rd Generation Partnership Project;Technical Specification Group Radio Access Network;Evolved Universal Terrestrial Radio Access Network(E-UTRAN); X2 interface user plane protocol(Release 15)", 3GPP TS 36.425, V15.0.0, Jun. 2018, pp. 1-17.

"3rd Generation Partnership Project;Technical Specification Group Radio Access Network;Evolved Universal Terrestrial Radio Access (E-UTRA) and Evolved Universal Terrestrial Radio Access Network (E-UTRAN); Overall description; Stage 2 (Release 15)", 3GPP TS 36.300, V15.7.0, Sep. 2019, pp. 1-365.

Zuo et al., "Learning-based Network Path Planning for Traffic Engineering", Future Generation Computer Systems, vol. 92, 2019, pp. 59-67.

Lee et al., "Machine Learning based RATs Selection supporting Multi-Connectivity for Reliability (Invited Paper)", International Conference on Cognitive Radio Oriented Wireless networks, 2019, pp. 1-11.

Kang et al., "Analysis of Dual Connectivity Gain in Terms of Delay and Throughput", International Conference on Information and Communication Technology Convergence (ICTC), Oct. 17-19, 2018, pp. 1218-1220.

Antonioli et al., "Dual Connectivity for LTE-NR Cellular Networks", XXXV Simpo' Sio Brasileiro de Telecomunicaco,O Es e Processamento de Sinais—SBrT2017, Nov. 2017, pp. 171-175.

"3rd Generation Partnership Project;Technical Specification Group Radio Access Network;Evolved Universal Terrestrial Radio Access (E-UTRA) and NR;Multi-connectivity; Stage 2 (Release 15)", 3GPP TS 37.340, V15.7.0, Sep. 2019, pp. 1-70.

"3rd Generation Partnership Project;Technical Specification Group Radio Access Network;Evolved Universal Terrestrial Radio Access (E-UTRA);Study on Small Cell Enhancements for E-UTRA and E-UTRAN—Higher layer aspects (Release 12)", 3GPP TR 36.842, V0.2.0, May 2013, pp. 1-38.

"3rd Generation Partnership Project;Technical Specification Group Radio Access Network;Study on new radio access technology: Radio access architecture and interfaces (Release 14)", 3GPP TR 38.801, V14.0.0, Mar. 2017, pp. 1-91.

Extended European Search Report received for corresponding European Patent Application No. 20164790.6 , dated Sep. 18, 2020, 7 pages.

* cited by examiner (a)

| Time | Data in Fly MgNB | Data in Fly SeNB |
|---|---|---|
| 55.972 | 1524864 | 1591584 |
| 55.973 | 1494320 | 1591584 |
| 55.974 | 1494320 | 1602768 |
| 55.975 | 1505504 | 1602768 |
| 55.976 | 1505504 | 1613952 |
| 55.977 | 1516688 | 1613952 |
| 55.978 | 1516688 | 1625136 |
| ... | ... | ... |

(b)

| Time | Expected throughput MgNB | Expected throughput SeNB |
|---|---|---|
| 55.97 | 28000000 | 28000000 |
| 55.98 | 28355000 | 28724000 |
| 55.99 | 28724000 | 30544000 |
| 56.00 | 29012000 | 28000000 |
| 56.01 | 28355000 | 29012000 |
| 56.02 | 28000000 | 28000000 |
| 56.03 | 30544000 | 28432000 |
| ... | ... | ... |

(c)

| Time | Delay in MgNB leg | Delay in SeNB leg |
|---|---|---|
| 55.972 | 49.19 | 49.05 |
| 55.973 | 49.25 | 49.42 |
| 55.974 | 49.55 | 49.51 |
| 55.975 | 49.67 | 49.78 |
| 55.976 | 49.92 | 49.87 |
| 55.977 | 49.99 | 50.15 |
| 55.978 | 50.28 | 50.24 |
| ... | ... | ... |

Fig. 14

APPARATUS, METHOD AND COMPUTER PROGRAM FOR ROUTING DATA IN A DUAL OR MULTI-CONNECTIVITY CONFIGURATION

FIELD OF THE INVENTION

Various example embodiments relate to mobile or wireless telecommunication systems, and in particular to data routing in a dual or multi-connectivity configuration.

BACKGROUND

Examples of mobile or wireless telecommunication systems may include the universal mobile telecommunications system (UMTS) terrestrial radio access network (UTRAN), long term evolution (LTE) evolved UTRAN (E-UTRAN), LTE-advanced (LTE-A), LTE-A Pro, and/or fifth generation (5G) radio access technology (RAT) or new radio (NR) access technology. 5G or NR wireless systems refer to the next generation (NG) of radio systems and network architecture. It is estimated that NR will provide bitrates on the order of 10-20 Gbit/s or higher and will support at least enhanced mobile broadband (eMBB) and ultra-reliable low-latency-communication (URLLC). NR is expected to deliver extreme broadband and ultra-robust, low latency connectivity and massive networking to support the Internet of things (IoT). With IoT and machine-to-machine (M2M) communication becoming more widespread, there will be a growing need for networks that meet the needs of lower power, high data rates, and long battery life. It is noted that a node that can provide in 5G or NR radio access functionality to a user equipment (UE) (i.e., similar to Node B in E-UTRAN or eNB in LTE) or that can support 5G or NR as well as connectivity to next generation core (also denoted by NGC or 5GC) may be referred to as a next generation or 5G Node B (also denoted by gNB or 5G NB).

SUMMARY

According to an example embodiment, there is provided an apparatus comprising means for performing, at a central unit (CU) of a master node: receiving an individual packet data unit (PDU) from one or more incoming PDUs, wherein each PDU is to be transmitted to a user equipment (UE) device via one amongst respective paths towards at least one distributed unit (DU) of the master node and at least one secondary node, the UE device being in dual or multi-connectivity with the master node and the at least one secondary node; collecting a respective data set for each of the paths; receiving, from a machine learning model inputting each data set, a respective estimated delay of transmission for each of the paths; selecting, from each of the paths, a path based on the estimated delay of transmission; and transmitting the PDU to the UE device via the selected path.

The apparatus may further comprise means for performing, at times, after transmitting the PDU to the UE device via the selected path: receiving, from one of the at least one DU of the master node or one of the at least one secondary node depending on towards which the PDU has been transmitted via the selected path, a measured delay of transmission for the selected path.

The apparatus may further comprise means for performing: collecting information about the data set for each of the paths and the measured delay of transmission for the selected path; determining whether the collected information verifies a predetermined condition; and triggering a training of the machine learning model when the predetermined condition is verified.

The predetermined condition may comprise at least one of: a size of the collected information is equal to or higher than the predetermined size threshold value; and a delay estimation error is equal to or higher than a predetermined error threshold value, the delay estimation error being computed based on a comparison, for the selected path, between the estimated delay of transmission and the measured delay of transmission.

The machine learning model may comprise a neural network (NN) model or an artificial neural network (ANN) model.

The apparatus may further comprise means for performing, when the machine learning model comprises a recurrent neural network (RNN) model: updating, when the delay estimation error is equal to or higher than the predetermined error threshold value, a time interval during which the data set is recurrently collected; and uploading the machine learning model that is associated with the updated time interval.

The measured delay of transmission for the selected path may be received during a time period at least whenever the training of the machine learning model is triggered, and the training of the machine learning model may comprise: performing a correspondence between the data set input in the machine learning model and the measured delay of transmission, for the selected path.

The measured delay of transmission may be measured at a media access control (MAC) layer of the at least one DU of the master node and the at least one secondary node, and received from each of the at least one DU of the master node via a respective F1 interface and from each of the at least one secondary node via a respective X2 interface.

The data set may comprise at least data in flight and throughput.

The machine learning model may be initially trained during a time interval by collecting a data set and a corresponding measured delay of transmission for each of the paths during the time interval, and by performing a correspondence between the data set and the measured delay of transmission.

According to another example embodiment, there is provided a method performed at a CU of a master node, the method comprising: receiving an individual PDU, from one or more incoming PDUs, wherein each PDU is to be transmitted to a UE device via one amongst respective paths towards at least one DU of the master node and at least one secondary node, the UE device being in dual or multi-connectivity with the master node and the at least one secondary node; collecting a respective data set for each of the paths; receiving, from a machine learning model inputting each data set, a respective estimated delay of transmission for each of the paths; selecting, from each of the paths, a path based on the estimated delay of transmission; and transmitting the PDU to the UE device via the selected path.

The method may further comprise, after transmitting the PDU to the UE device via the selected path: receiving, from one of the at least one DU of the master node or one of the at least one secondary node depending on towards which the PDU has been transmitted via the selected path, at times, a measured delay of transmission for the selected path.

The method may further comprise: collecting information about the data set for each of the paths and the measured delay of transmission for the selected path; determining whether the collected information verifies a predetermined condition; and triggering a training of the machine learning model when the predetermined condition is verified.

The predetermined condition may comprise at least one of: a size of the collected information is equal to or higher than the predetermined size threshold value; and a delay estimation error is equal to or higher than a predetermined error threshold value, the delay estimation error being computed based on a comparison, for the selected path, between the estimated delay of transmission and the measured delay of transmission.

The machine learning model may comprise a neural network (NN) model or an artificial neural network (ANN) model.

The method may further comprise, when the machine learning model comprises a recurrent neural network (RNN) model: updating, when the delay estimation error is equal to or higher than the predetermined error threshold value, a time interval during which the data set is recurrently collected; and uploading the machine learning model that is associated with the updated time interval.

The measured delay of transmission for the selected path may be received during a time period at least whenever the training of the machine learning model is triggered, and the training of the machine learning model may comprise: performing a correspondence between the data set input in the machine learning model and the measured delay of transmission, for the selected path.

The measured delay of transmission may be measured at a MAC layer of the at least one DU of the master node and the at least one secondary node, and received from each of the at least one DU of the master node via a respective F1 interface and from each of the at least one secondary node via a respective X2 interface.

The data set may comprise at least data in flight and throughput.

The machine learning model may be initially trained during a time interval by collecting a data set and a corresponding measured delay of transmission for each of the paths during the time interval, and by performing a correspondence between the data set and the measured delay of transmission.

According to another example embodiment, there is provided a computer readable medium comprising program instructions stored thereon for performing any of the above methods.

According to another example embodiment, there is provided a computer program comprising computer executable code which, when run on at least one processor, may be configured to cause an apparatus to perform any of the above methods.

According to another example embodiment, there is provided an apparatus comprising at least one processor and at least one memory including computer program code, wherein the at least one memory and the computer program code are configured to, with the at least one processor, cause the apparatus to perform any of the above methods.

According to another example embodiment, there is provided a non-transitory computer readable medium comprising program instructions stored thereon for performing any of the above methods.

According to an aspect, there is provided a non-volatile tangible memory medium comprising program instructions stored thereon for performing any of the above methods.

According to an aspect, there is provided an apparatus comprising circuitry configured to perform any of the above methods.

In the above, many different example embodiments have been described. It should be appreciated that further example embodiments may be provided by the combination of any two or more of the example embodiments described above.

Various other example embodiments are also described in the following detailed description and in the attached claims.

BRIEF DESCRIPTION OF THE DRAWINGS

Some example embodiments will now be described with reference to the following accompanying drawings:

FIG. 14 shows an example embodiment of creation of a dataset by means of a simulation tool;

DETAILED DESCRIPTION

Dual connectivity (DC), as defined in 3GPP TR 36.842 v0.2.0, is used to refer to operation where a given UE (e.g., a mobile device, stationary device, IoT device, or any other device capable of communication with a wireless or wired communication network) consumes radio resources provided by at least two different network points connected with non-ideal backhaul. DC allows a user to simultaneously communicate with two or more different network nodes. Multi-connectivity (MC) extends the DC principle in the form of simultaneous connectivity to different RATs.

In the following, it is only for reasons of simplicity if the example embodiments refer to DC scenarios. It should be appreciated that these example embodiments can be readily extendable to MC scenarios or any other approach allowing the UE's data radio bearer (DRB) to be split among multiple network nodes or base stations.

Figure 1:
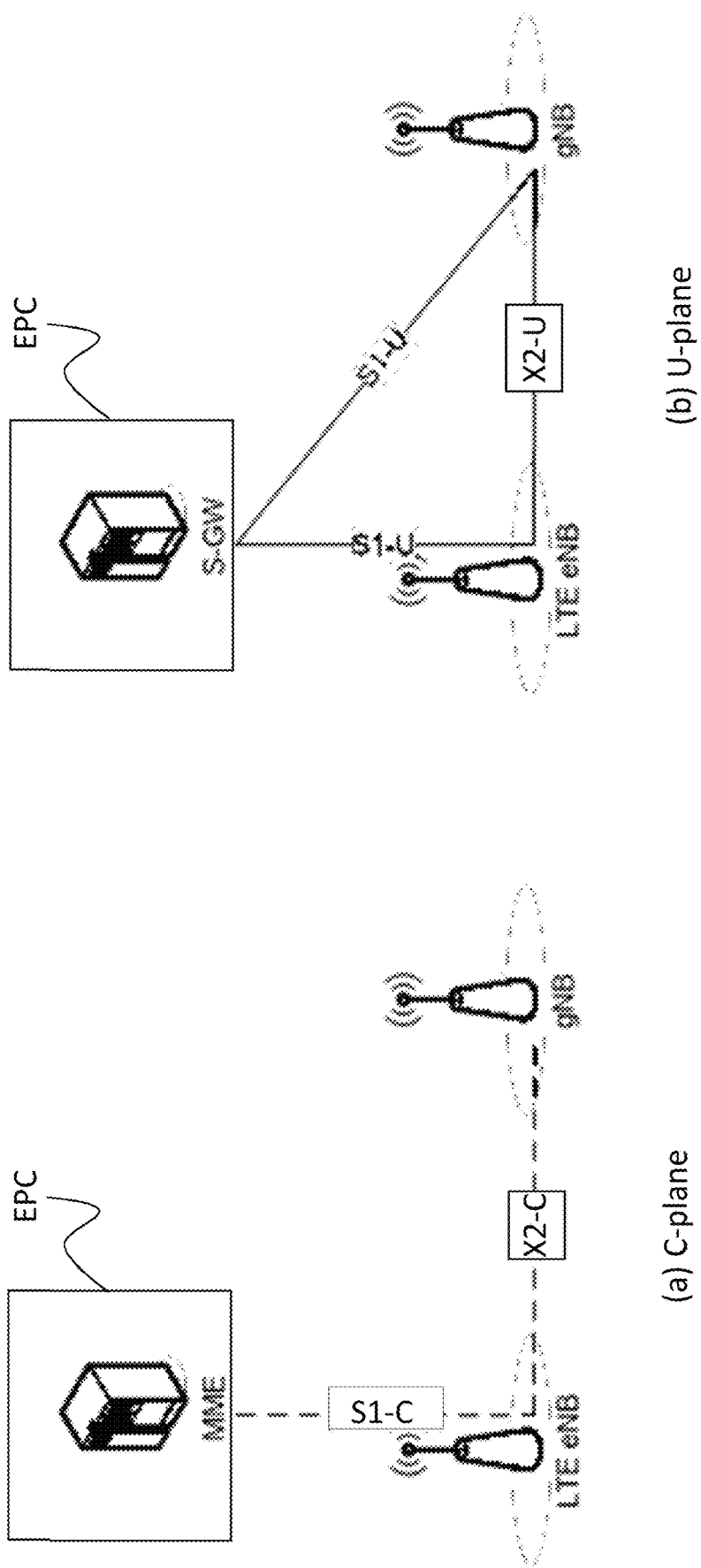
FIG. 1 shows an example embodiment of a network interface configuration for NSA deployment option 3a between gNB and LTE eNB connected to EPC in: (a) C-plane and (b) U-plane.

3GPP TR 38.801 V14.0.0 discloses different architecture and RAN-level interworking options for which, for example, a UE can connect to the network using 4G (E-UTRA) access and/or 5G (NR) access connecting to the evolved packet core (EPC) or the NGC. Therein, the LTE evolved node B (LTE eNB) can provide the E-UTRA U-plane and C-plane protocol terminations towards the UE, while the gNB can provide the NR U-plane and C-plane protocol terminations towards the UE. These deployment options have been primarily grouped into standalone (SA) category where there is only one independent access network (either E-UTRA or NR) that is connected to either the EPC or the NGC, and non-standalone (NSA) category where both E-UTRA and NR RATs are present, one of the access networks (E-UTRA, NR) assisting the other in connecting to either an EPC or a NGC. RAN-level interworking is required in a NSA where 5G (NR) cannot be used without LTE FIG. 1 shows an example embodiment of a network interface configuration for NSA deployment option 3a between gNB and LTE eNB connected to EPC in: (a) C-plane (used for signaling or control messages) and (b) U-plane (used for data traffic).

As depicted, the EPC core network (CN) may comprise a mobility management entity (MME) and a serving gateway (S-GW). The SGW is the U-plane node of the EPC whose key function is to forward and route packets to and from a network node (e.g., LTE eNB, gNB) and packet data network gateway (PGW). The MME is the C-plane node of the EPC whose key function is to connect/release bearers to a device.

In the C-plane, X2-C is the network interface between LTE eNB and gNB, and S1-C is the network interface between LTE eNB and MME.

In the U-plane, X2-U is the network interface between LTE eNB and gNB, and S1-U is the network interface between LTE eNB and S-GW and between gNB and S-GW. Thereby, the data traffic may split across LTE eNB (4G) and gNB (5G) at the S-GW of the EPC.

Figure 2:
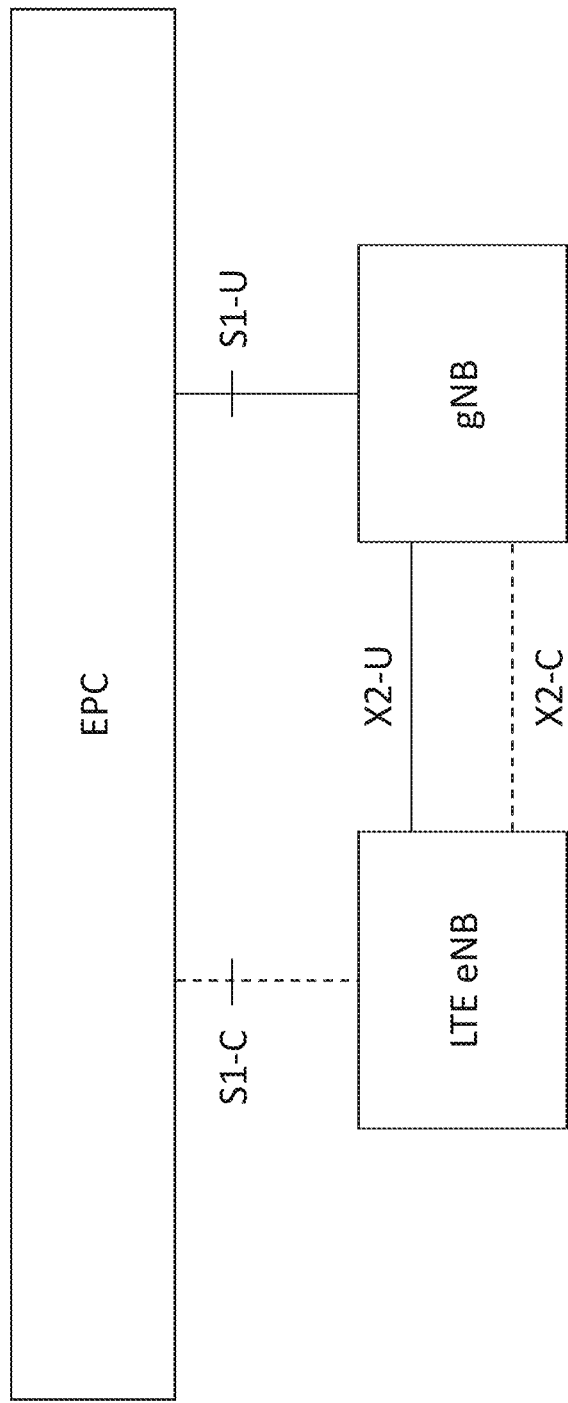
FIG. 2 shows an example schematic embodiment of a network interface configuration for NSA deployment option 3x between gNB and LTE eNB connected to EPC.

FIG. 2 shows an example schematic embodiment of a network interface configuration for NSA deployment option 3x between gNB and LTE eNB connected to EPC.

In the C-plane, X2-C is the network interface between LTE eNB and gNB, and S1-C is the network interface between LTE eNB and EPC (MME).

In the U-plane, X2-U is the network interface between LTE eNB and gNB, and S1-U is the network interface between gNB and EPC (S-GW). Thereby, the data traffic may split across LTE eNB (4G) and gNB (5G) at the gNB.

Figure 3:
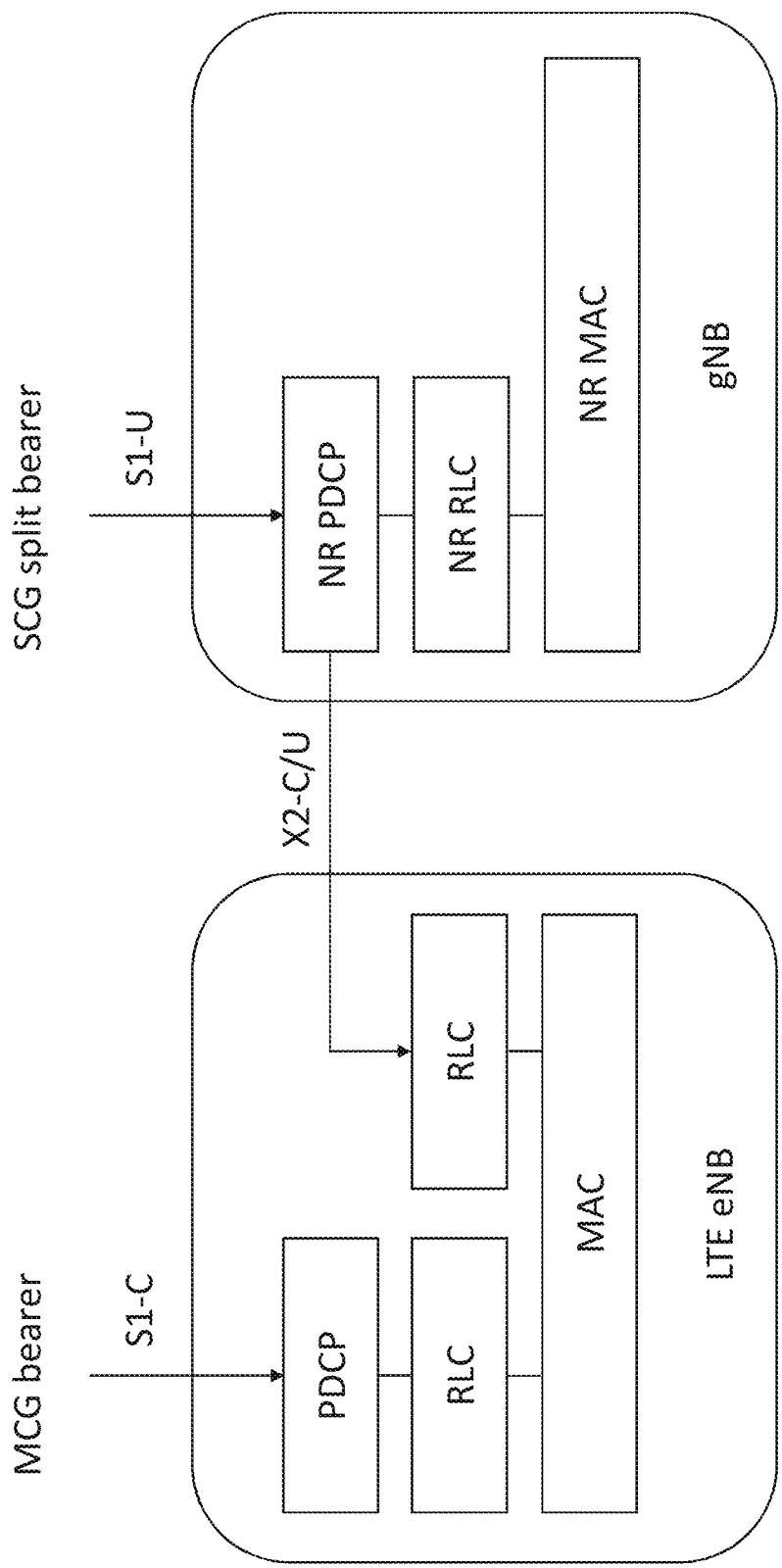
FIG. 3 shows an example embodiment of a radio protocol architecture for SCG split bearer for NSA deployment option 3x between gNB and LTE eNB.

FIG. 3 shows an example embodiment of a radio protocol architecture for SCG split bearer for NSA deployment option 3x between gNB and LTE eNB.

The option 3x represents an NSA deployment capable of supporting SCG split bearer and tight interworking between E-UTRA and NR which are controlled by only EPC connected to the LTE eNB over the C-plane interface S1-C.

As shown, NR PDCP is used for the secondary cell group (SCG) split bearer terminated at the gNB, while E-UTRA PDCP is used for the master cell group (MCG) bearer terminated at the LTE eNB.

As shown, each of LTE eNB and gNB comprises a radio protocol stack including a medium access control (MAC) layer above a physical (PHY) layer, a radio link control (RLC) layer above the MAC layer, and a packet data convergence protocol (PDCP) layer above the RLC layer. Moreover, MCG bearer is terminated at the PDCP layer of the LTE eNB node (i.e., at E-UTRA PDCP), while SCG split bearer, which is directly connected from the SGW of the EPC to the gNB, is terminated at the PDCP layer of the gNB (i.e., at NR PDCP). Thus, routing can be performed at the transmitting PDCP layer of the gNB (i.e., at NR PDCP), and the data traffic can be split and sent from the PDCP layer of the gNB (i.e., from NR PDCP) to the lower layers (RLC, MAC) of both the gNB and the LTE eNB.

Figure 4:
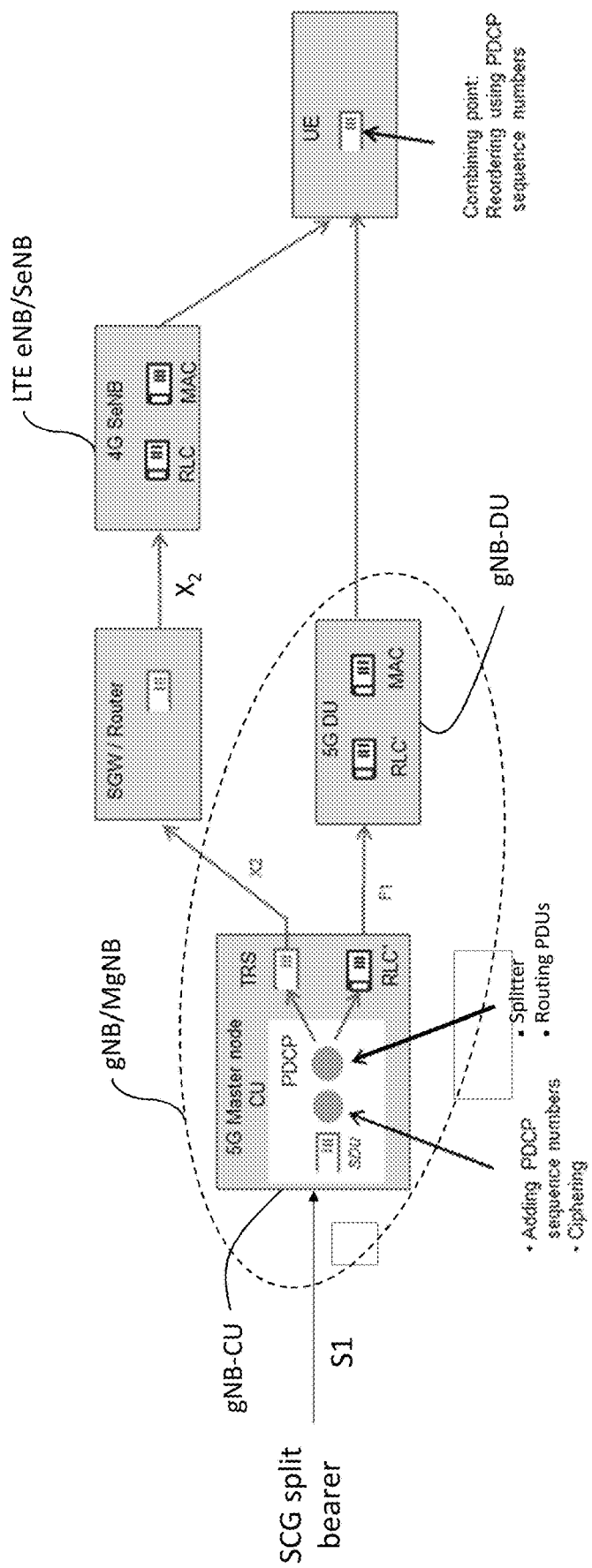
FIG. 4 shows an example embodiment of an NSA U-plane data split configuration between a gNB (5G node) and an LTE eNB (4G node) in communication with UE.

In connection with FIGS. 2 and 3, FIG. 4 shows an example embodiment of an NSA U-plane data split configuration between gNB (5G node) and LTE eNB (4G node) in communication with UE.

In NR access technology, the RAN architecture may be split into a centralized unit (CU) and one or more distributed units (DUs) in order to enhance the network flexibility. The CU is a logical node that may include the gNB functions, excepting those functions allocated exclusively to the DU. The DU, whose operation is controlled by the CU, is a logical node that may include a subset of the gNB functions which is defined based on functional split options corresponding to interfaces of layers of the protocol stack (RRC-PDCP, PDCP-RLC, RLC-MAC, MAC-PHY and PHY-RF) as well as internal splits within the RLC, MAC and PHY layers, as found in 3GPP.

As depicted in FIG. 4, the gNB (see dashed line) may consist of a gNB-centralized unit (gNB-CU) and a gNB-distributed unit (gNB-DU), and the respective logical interface between gNB-CU and each gNB-DU may be designated as F1. The gNB may act as a master node (MN) and may be denoted in the following by MgNB, while the LTE eNB may act as a secondary node (SN) and may be denoted in the following by SeNB. This example embodiment may correspond to a functional split option where RLC layer is split into RLC' and RLC" layers. The RLC" layer may support the function of transmitting entities (e.g., PDCP PDUs), whereas the RLC' layer may support the function of receiving these entities (e.g., PDCP PDUs). As shown, the PDCP and RLC" layers may be located in the CU of the master node (i.e., in gNB-CU), and the RLC' and MAC layers may be located in the DU of the master node (i.e., in gNB-DU). In this example functional split option using an interface format inheriting from the interfaces PDCP-RLC" and RLC'-MAC, the flow control may be located in the PDCP layer of the CU.

As depicted in FIG. 4, the PDCP layer located in the CU of the master node (i.e., in gNB-CU) is in the transmitting side and may then be configured to transmit service data units (SDUs) and protocol data units (PDUs) to a peer PDCP layer located in the receiving side (i.e., in UE). The PDCP layer in the receiving side may be configured to then extract the PDCP SDUs from the transmitted PDCP PDUs.

In more details, the PDCP layer may receive PDCP SDUs from an RLC entity, store them in a transmission buffer and assign a sequence number (SN) for each of them. In the case where a data radio bearer (DRB) (i.e., a radio bearer of the U-plane used as a path for transmitting user data on the U-plane) is set, the PDCP layer may perform a header compression of the PDCP SDUs and a ciphering of the resulting PDCP SDUs. The PDCP layer may generate corresponding PDCP PDUs by adding a header to the ciphered resulting PDCP SDUs and forward the generated PDCP PDUs to the RLC layer prior to being sequentially transmitted to the UE via one or more network nodes. Upon receiving the PDCP PDUs, the PDCP layer of the UE may remove the header of each PDCP PDU, perform a deciphering of the PDCP PDUs without their header, perform a header decompression of the deciphered PDCP PDUs to obtain the corresponding PDCP SDUs, and sequentially deliver the PDCP SDUs to an upper layer after re-ordering them using their sequence numbers.

In the transmission side, the PDCP layer of the CU of the master node (i.e., gNB-CU) may comprise a data split function entity (hereafter designated as a splitter) whose function may be to decide whether a PDCP PDU is to be transmitted to a path towards the DU of the master node (i.e., towards gNB-DU) via the F1 interface or to another path towards the secondary node (i.e., towards LTE eNB) via the X2 interface and a S-GW-based router.

The decision may be based on an estimation of the delay of transmission for the different paths. In an example embodiment, the splitter may calculate, by means of a mathematical or analytic formulation, an estimation of the delay of transmission for each path that a PDU can experience and then route the PDU towards the shortest path in terms of time delay, so that the PDUs can reach the UE in a faster way.

In an example embodiment, the mathematical formulation may be based on Little's law to calculate the estimated delays of transmission for different paths for incoming PDUs.

According to Little's law, the mean sojourn time W of an item in a queueing system is given by:

$$W = L/\lambda = L/TH \tag{1}$$

where "$\lambda$" is the rate at which the items arrive at the queuing system, "L" is the mean number of items in the queueing system, and "TH" is the rate at which the items leave the queueing system.

Based on Little' law, the delays W_M and W_S, wherein the subscript "M" is used for the master node and the subscript "S" is used for the secondary node, are calculated based on analytical methods using input parameters from downlink data delivery status (DDDS) messages.

In particular, "W_M" and "W_S" may be defined as follows:
"W_M" is the calculated delay that an incoming PDCP PDU reaching the splitter at the PDCP layer would have if it was sent to the MAC layer of the master node through the F1 interface, and
"W_S" is the calculated delay that an incoming PDCP PDU would have if it was sent to the MAC layer of the secondary node through the X2 interface.

In an example embodiment, the input parameters may comprise:
data in flight in the path towards the MAC layer of the master node. Basically, data in flight refers to the number of PDUs in queue to be transmitted by the PDCP layer. Its value, which is expressed in number of bytes, is maintained at the PDCP layer of the CU of the master node, and when the splitter makes the decision to route an incoming PDCP PDU through the F1 interface, the value of this parameter is then incremented by the PDU size. On the other hand, when a report on the effective transmission of PDCP PDUs (e.g., a DDDS message), which contains the byte size (or number of bytes) that has been transferred to the MAC layer of the master node, is sent back from the MAC layer of the master node through the F1 interface, the value of this parameter is then decremented by this byte size (or number of bytes) that has been transferred to the MAC layer of the master node;
data in flight in the path towards the MAC layer of the secondary node. Basically, data in flight refers to the number of PDUs in queue to be transmitted by the PDCP layer. Its value, which is expressed in number of bytes, is maintained at the PDCP layer of the CU of the master node, and when the splitter makes the decision to route an incoming PDCP PDU through the X2 interface, the value of this parameter is then incremented by the PDU size. On the other hand, when a report on the effective transmission of PDCP PDUs (e.g., a DDDS message), which contains the byte size (or number of bytes) that has been transferred to the MAC layer of the master node, is sent back from the MAC layer of the secondary node through the X2 interface, the value of this parameter is then decremented by this byte size (or number of bytes) that has been transferred to the MAC layer of the secondary node;
the throughput per bearer, which considers different quality of service class identifier (QCI) indices of bearers, is calculated at the MAC layer of the master node and transmitted to the master node in a DDDS message through the F1 interface or any other proprietary interface; and
the throughput per bearer, which considers different QCI indices of bearers, is calculated at the MAC layer of the secondary node and transmitted to the master node in a DDDS message through the X2 interface.

However, the DDDS messages may usually experience a delay of transmission in the transport network. Moreover, the frequency of these DDDS messages through the F1 and X2 interfaces may be much lower than the frequency of incoming PDCP PDUs at the splitter. It results therefrom that accurate information about throughput and data in flight may be not available at the splitter when it makes its routing decision, which may lead to erroneous delay calculations. The impact may even be more significant when the load conditions dynamically change or there are congestions on the F1 and X2 interfaces, which may cause further delays and congestions on these F1 and X2 interfaces. For example, a direct consequence of erroneously sending PDUs towards paths with higher delays may be an arrival of PDUs at the UE in a different order than the PDCP sequence numbers for each incoming PDU. This may then require reordering the PDUs at the UE for some higher layer protocols, thereby causing more delays in transporting these PDUs to the upper layer such as the transmission control protocol (TCP) layer. It may cause further delays in TCP acknowledgements towards the sender entity, which may lead to reduce the TCP windows size and as such the data rate towards the UE.

In an effort to mitigate the lack of accuracy in the estimation of the delays of transmission, an example embodiment may consist in applying a correction term when calculating the delays W_M and W_S.

For example, the correction term for W_M may acknowledge for PDUs in flight that have been transferred to the MAC layer of the master node but for which the respective DDDS messages have not yet arrived at the splitter of the master node.

For example, the correction term for W_S may acknowledge for PDUs in flight that have been transferred to the MAC layer of the secondary node but for which the respective DDDS messages have not yet arrived at the splitter of the master node.

Both correction terms may be based on latency and throughput parameters, and in particular on:
- a first latency parameter, which denotes the time a PDU needs for transmission from the CU of the master node to the secondary node if there is no queueing;
- a second latency parameter, which denotes the time a PDU needs for transmission from the CU of the master node to the DU of the master node if there is no queueing;
- a first throughput parameter, which denotes the throughput of the UE bearer measured at the MAC layer of the master node;
- a second throughput parameter, which denotes the throughput of the UE bearer measured at the MAC layer of the secondary node; and
- other parameters considering the time intervals within which PDUs have been transferred to the MAC layer but not yet acknowledged in the DDDS messages reported to the splitter of the master node.

Although the use of these correction terms may give improved results when the load and delay conditions do not change much, this may be no longer the case when the load and delay conditions change dynamically.

In an attempt to enhance an accuracy in the estimation of the delays of transmission in the case of dynamic load and delay conditions, an example embodiment may consist in using a machine learning (ML) model instead of a mathematical or analytic formulation or algorithm, e.g., instead of the aforementioned one based on Little's law.

Figure 5:
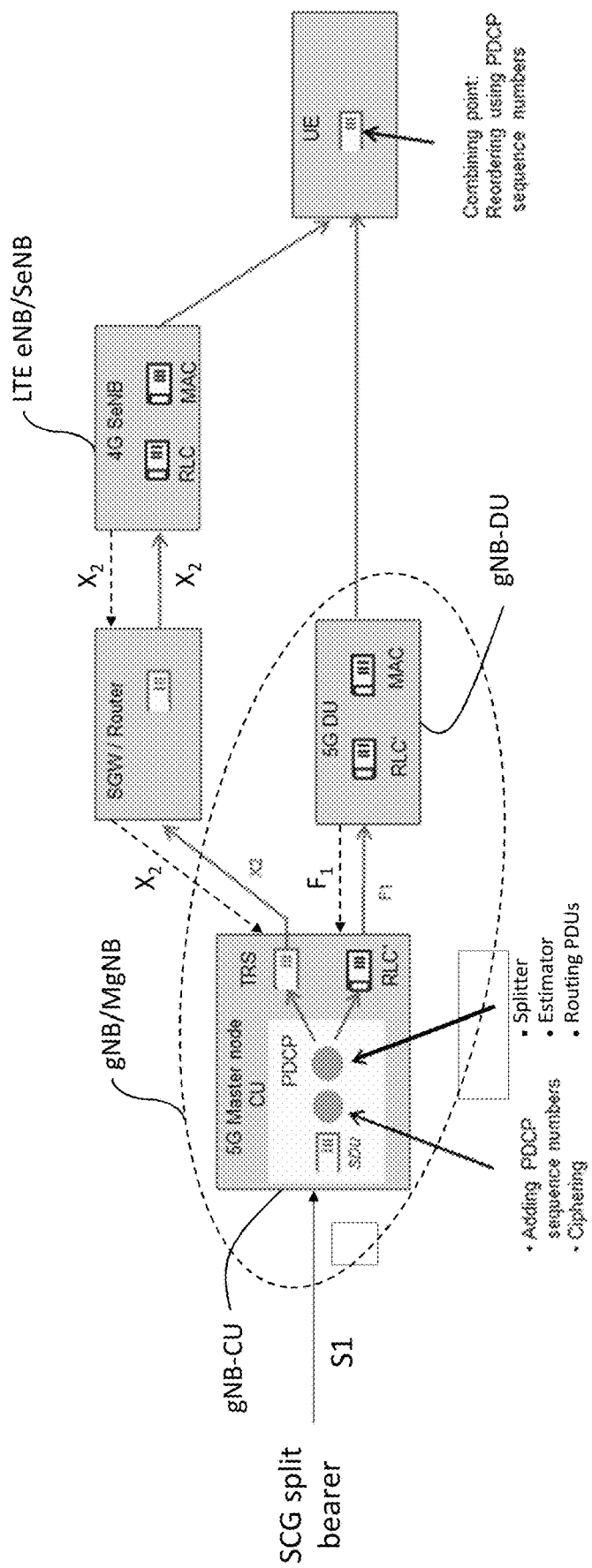
FIG. 5 shows an example embodiment of an NSA U-plane data split configuration using a ML model.

FIG. 5 shows an example embodiment of the NSA U-plane data split configuration using a ML model.

The ML model may comprise a neural network (NN) or an artificial neural network (ANN) model, itself comprising, for example, but not limited to, a deep neural network (DNN) (also known as feedforward neural network (FNN) or multilayer perceptron) model, a recurrent neural network (RNN) model or a convolutional neural network (CNN) model, among others.

The PDCP layer of the CU of the master node (i.e., of gNB-CU of MgNB) may comprise the ML model, which may be configured to act as an estimator whose function may be to estimate the delays of transmission for each path that a PDU can experience when outputting from the splitter to reach the MAC layer of the DU of the master node (i.e., of gNB-DU of MgNB) via the F1 interface and MAC layer of the secondary node (i.e., of SeNB) via the X2 interface and the S-GW-based router.

Figure 6:
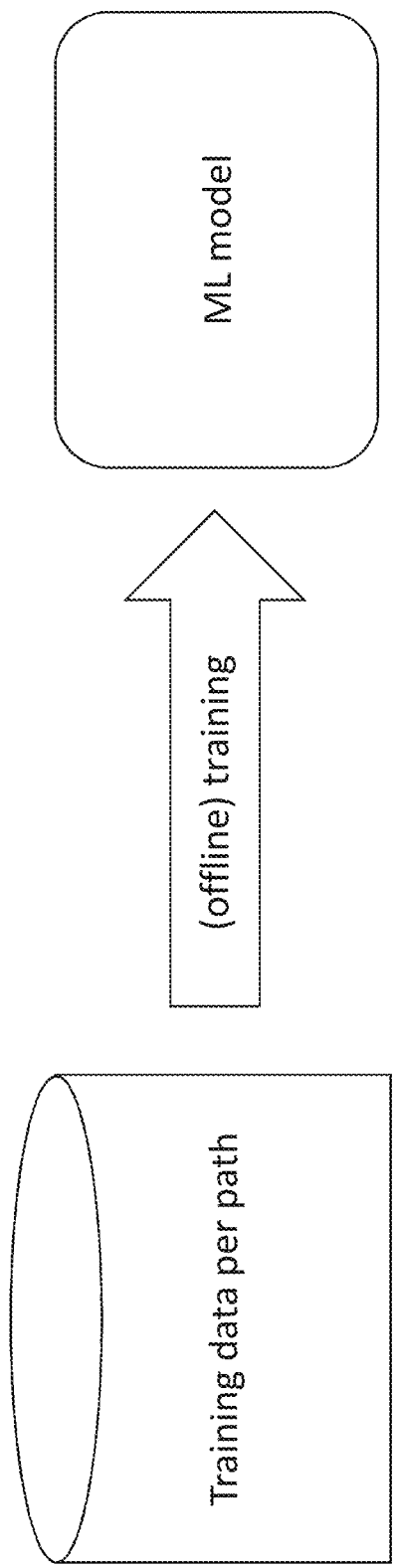
FIG. 6 shows an example embodiment of an offline training phase of a ML model.

FIG. 6 shows an example embodiment of an offline training phase of the ML model.

The ML model requires an initial offline training to calculate its needed weights and bias prior to being used to infer estimated delays of transmission for each path. In this regard, training data per path is needed and may comprise, for each path, an input data set to be input into the ML model and a corresponding measured delay of transmission. Each input data set may include at least data in flight and throughput. In an example embodiment, each input data set may include further types of data (e.g., PDU size, etc.) in addition to the data in flight and throughput. It should be noted that data in flight refers to the number of PDUs in queue to be transmitted by the PDCP layer of the CU of the master node. The initial offline training procedure may comprise collecting the training data per path and performing a correspondence per path between the input data set and the measured delay of transmission. The duration of the offline training may depend on the necessary time to collect the training data for each path. Furthermore, to perform a correspondence per path between the collected input data set and measured delay of transmission, it may be needed to have identification means (e.g., an identifier, a time stamp) associated with each measured delay of transmission. In an example embodiment, the identification means may be generated at the PDCP layer of the CU of the master node.

Referring to the NSA U-plane data split configuration of FIG. 5, the training data may be collected at the CU of the master node as follows. The delay of transmission for the path between the splitting point of the splitter and the MAC layer of the master node, that is the MAC layer located in the DU of the master node (i.e., in gNB-DU), and for the path between the splitting point of the splitter and the MAC layer of the secondary node (i.e., of SeNB), may be measured at each MAC layer and reported to the CU of the master node via the F1 interface in the case of the DU of the master node and via the X2 interface in the case of the secondary node. Each throughput from the collected input data set per path may be measured at each of the MAC layer located in the DU of the master node and the MAC layer of the secondary node, and reported inside a DDDS message to the CU of the master node via the F1 interface in the case of the DU of the master node and via the X2 interface in the case of the secondary node. The value (expressed in number of bytes) of each data in flight from the collected input data set per path may be maintained and/or updated at the PDCP layer of the CU of the master node as explained above. The byte size or number of bytes, which has been transferred to the MAC layer located in the DU of the master node, may be reported inside a DDDS message to the CU of the master node via the F1 interface, to update the value of the corresponding data in flight. The byte size or number of bytes, which has been transferred to the MAC layer of the secondary node, may be reported inside a DDDS message to the CU of the master node via the X2 interface, to update the value of the corresponding data in flight. In an example embodiment, the measured delay of transmission per path may be also reported inside a DDDS message to the CU of the master node via the F1 interface when the delay of transmission is measured at the MAC layer of the DU of the master node and via the X2 interface when the delay of transmission is measured at the MAC layer of the secondary node. It should be appreciated that the frequency of DDDS messages via the F1 and X2 interfaces may be configurable with predefined values ranging, for example, but not limited to, from 10 to 50 ms. In an example embodiment, the same DDDS message may be used to report the throughput, the byte size or number of bytes, and the measured delay of transmission.

Figure 7:
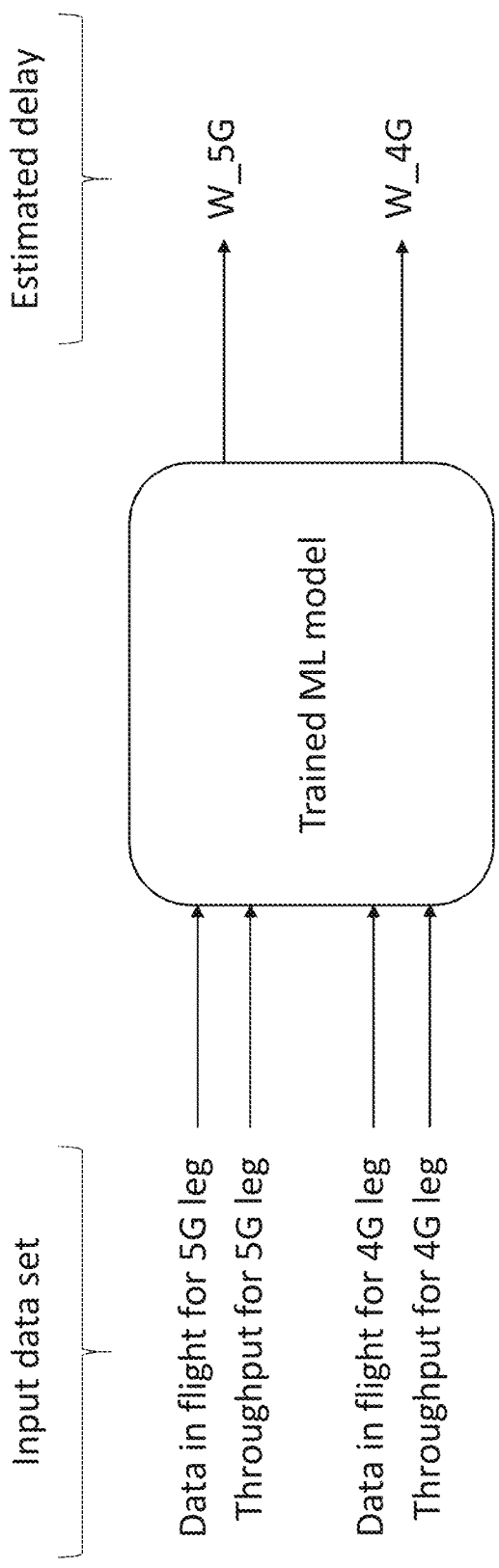
FIG. 7 shows an example embodiment of an online inference phase of a ML model trained for estimating a delay of transmission per path.

FIG. 7 shows an example embodiment of an online inference phase of the ML model trained for estimating (or predicting) a delay of transmission per path.

Once the ML model has been initially trained using the above-mentioned offline training procedure, the trained ML model may be then used to output an estimated delay of transmission for each path based on inputting a respective input data set per path collected over time. As shown, the trained ML model may input the collected input data set (e.g., data in flight and throughput as depicted in the example embodiment of FIG. 7) for each path (depicted as 4G leg for the path towards the secondary node and 5G leg for the path towards the DU of the master node). As further shown, the trained ML model may output the estimated delay of transmission (W_5G, W_4G) for each leg (5G leg, 4G leg). It should be appreciated that the estimated delay of transmission for the 4G leg (respectively, 5G leg) may be the delay of transmission that there will be for a PDCP PDU if it is transmitted from the splitting point of the splitter to the UE via the 4G leg (respectively, 5G leg).

Each estimated delay of transmission (W_5G, W_4G) output from the ML model may be then provided to the splitter. Based on at least the received estimated delay of transmission (W_5G, W_4G) for each path (5G leg, 4G leg), the splitter may select for each incoming PDCP PDU one path amongst each path (5G leg, 4G leg) via which the corresponding PDCP PDU may be transmitted to reach the UE. In an example embodiment, the selection of the path may be based on the received estimated delay of transmission (W_5G, W_4G) for each path (5G leg, 4G leg) in order to determine that path for which the estimated delay of transmission is the shortest. In another example embodiment, the selection of the path may be based not only on the received estimated delay of transmission (W_5G, W_4G) for each path (5G leg, 4G leg) but also on other criteria like the load for load balancing purpose (e.g., amount of UEs connected to each network node) in order to determine said selected path (i.e., 5G leg or 4G leg).

Figure 8:
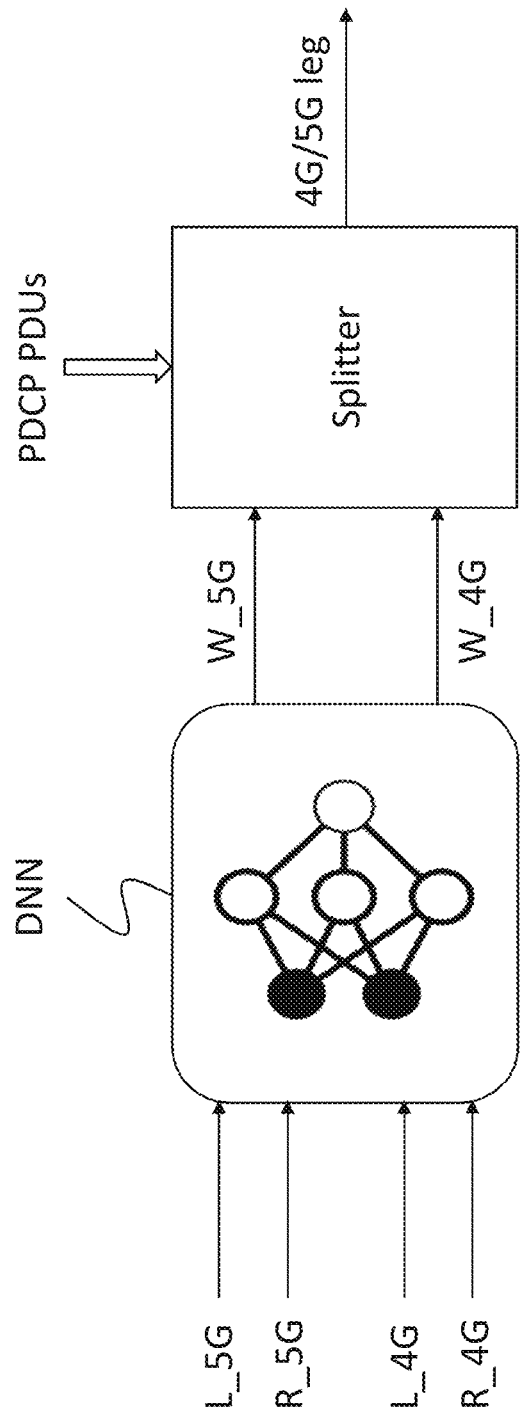
FIG. 8 shows an example implementation of an individual DNN model trained for estimating a delay of transmission per path.

FIG. 8 shows an example implementation of the ML model trained for estimating (or predicting) a delay of transmission per path, in the case where the ML model is an individual DNN model.

As shown, a single trained DNN model (denoted by DNN) may receive an input data set per path collected over time. The input data set may comprise a first input data set including data in flight (L_5G) and throughput (R_5G) for the 5G leg, and a second input data set including data in flight (L_4G) and throughput (R_4G) for the 4G leg. The output data comprises a first estimated delay of transmission (W_5G) for the 5G leg and a second estimated delay of transmission (W_4G) for the 4G leg.

The first and second estimated delays of transmission (W_5G, W_4G) are input over time into the splitter which may receive one or more incoming PDCP PDUs at a certain frequency (e.g., one packet per 10 ms). Based on at least the received output data (W_5G, W_4G) from the single trained DNN model, the splitter may select amongst the 5G and 4G legs, for each incoming PDCP PDU, one path (i.e., 5G leg or 4G leg) via which the corresponding PDCP PDU may be transmitted to reach the UE.

Figure 9:
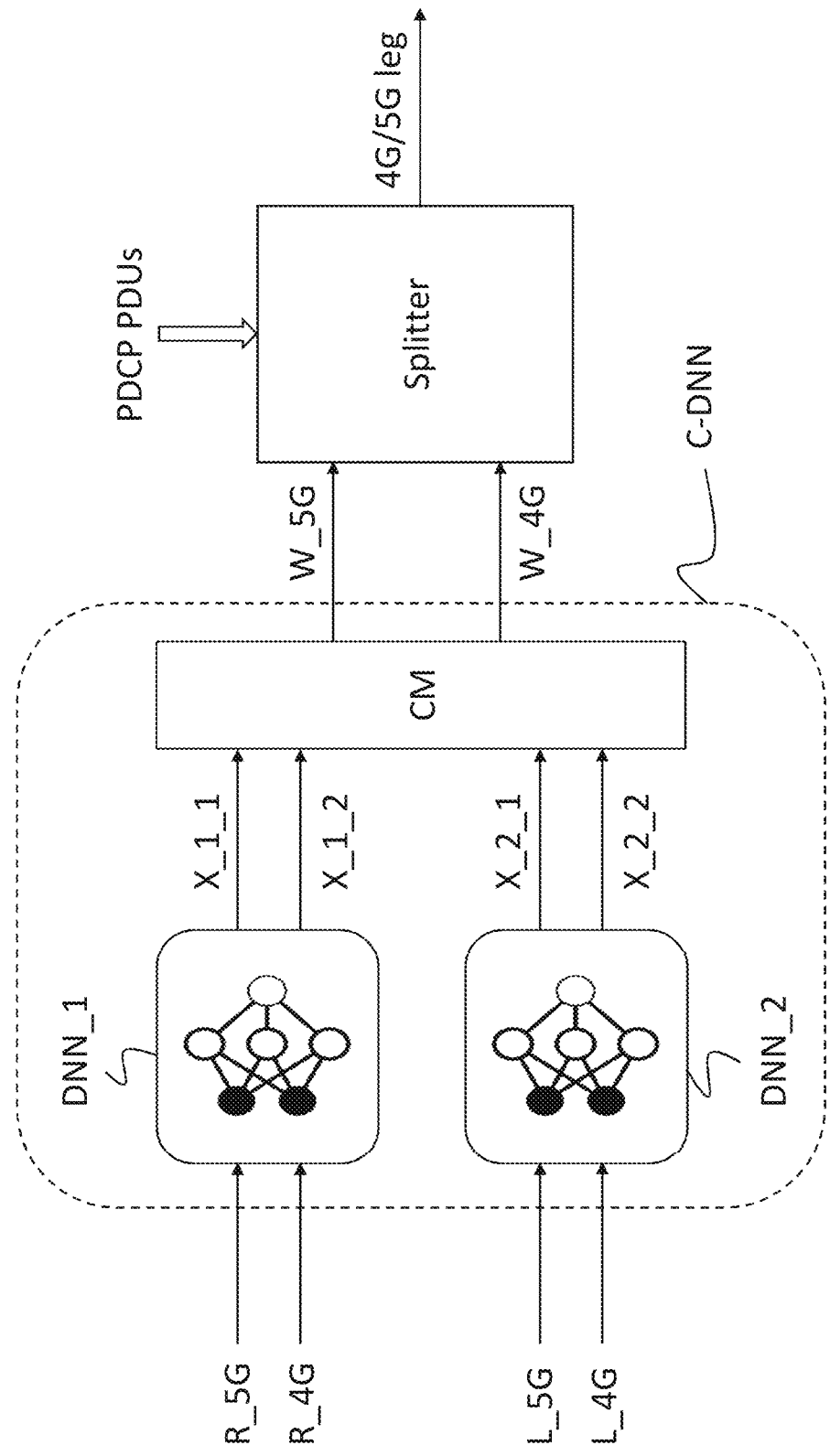
FIG. 9 shows an example implementation of a DNN model split into two individual trained DNN models and trained for estimating a delay of transmission per path.

FIG. 9 shows an example implementation of the ML model trained for estimating (or predicting) a delay of transmission per path, in the case where the ML model is a DNN model split into two individual DNN models. Such a split DNN model will be hereafter designated as a concatenation-based DNN (C-DNN) model.

As shown, a trained C-DNN model may, in an example configuration, be split into two individual trained DNN models (denoted by DNN_1 and DNN_2) according to the two types (e.g., data in flight and throughput) of data of the input data set. It should be appreciated that the trained C-DNN model may, in another example configuration, be split into more than two individual trained DNN models in the case where the number of types of data of the input data set is greater than two. The first trained DNN model (DNN_1) may input over time throughputs (R_5G for the 5G leg, R_4G for the 4G leg) measured at and reported, inside a respective DDDS message, from the MAC layer of the DU of the master node via the F1 interface for the 5G leg and from the MAC layer of the secondary node via the X2 interface for the 4G leg, and may then provide first output data (X_1_1, X_1_2) to a concatenation module (CM). The second trained DNN model (DNN_2) may input over time data in flight (L_5G for the 5G leg, L_4G for the 4G leg), and may then provide second output data (X_2_1, X_2_2) to the concatenation module (CM).

The first output data (X_1_1, X_1_2) and the second output data (X_2_1, X_2_2) may be concatenated later together at the concatenation module (CM) (e.g., by being processed by more dense layers) to output a first estimated delay of transmission (W_5G) for the 5G leg and a second estimated delay of transmission (W_4G) for the 4G leg. These first and second estimated delays of transmission (W_5G, W_4G) are input over time into the splitter which may receive one or more incoming PDCP PDUs at a certain frequency (e.g., one packet per 10 ms). Based on at least the received output data (W_5G, W_4G) from the concatenation module (CM), the splitter may select amongst the 5G and 4G legs, for each incoming PDCP PDU, one path (i.e., 5G leg or 4G leg) via which the corresponding PDCP PDU may be transmitted to reach the UE.

Figure 10:
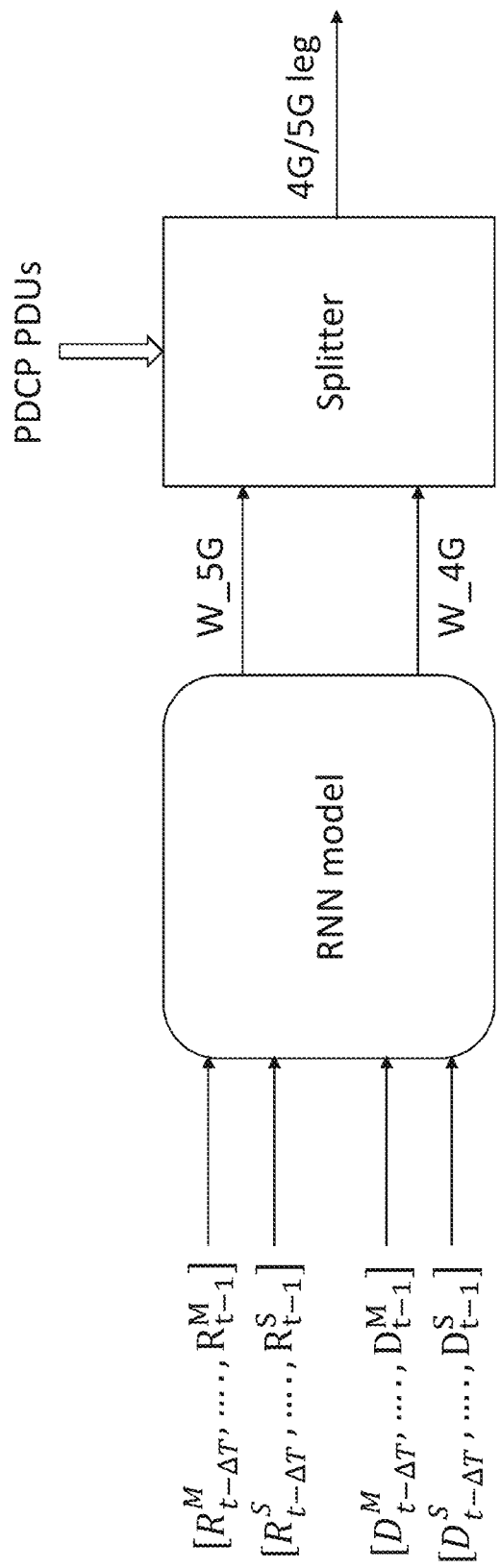
FIG. 10 shows an example implementation of an RNN model trained for estimating a delay of transmission per path.

FIG. 10 shows an example implementation of the ML model trained for estimating (or predicting) a delay of transmission per path, in the case where the ML model is a RNN model.

The RNN model may be used (e.g., instead of the DNN model) in order to account for historical information and cater time-varying nature of traffic and delay/congestion in the legs. Thereby, an estimation of the delays of transmission may be enhanced.

Unlike, for example, the DNN model into which data is input over time (e.g., at a time "t"), the RNN model requires time series information such that the input data per leg (5G, 4G) may be recurrently collected during a predefined time interval $\Delta T$ prior to being considered. Thus, as shown, the input data per leg of the trained RNN model may comprise:
- $[R_{t-\Delta T}^M, \ldots, R_{t-1}^M]$, which is the expected throughput for 5G leg during the time interval $\Delta T$;
- $[R_{t-\Delta T}^S, \ldots, R_{t-1}^S]$, which is the expected throughput for 4G leg during the time interval $\Delta T$;
- $[D_{t-\Delta T}^M, \ldots, D_{t-1}^M]$, which is the data in flight for 5G leg during the time interval $\Delta T$; and
- $[D_{t-\Delta T}^S, \ldots, D_{t-1}^S]$, which is the data in flight for 4G leg during the time interval $\Delta T$.

It should be appreciated that the same type of input data may be used for both the training and inference phases.

As shown, the RNN model may collect during each time interval $\Delta T$ the above-mentioned input data. Once collected, the input data may be provided at once to the RNN model which may then provide output data (i.e., estimated delay of transmission (W_5G) for the 5G leg and estimated delay of transmission (W_4G) for the 4G leg) to the splitter.

After each time interval $\Delta T$, the output data (W_5G, W_4G) are input into the splitter which may receive one or more incoming PDCP PDUs at a certain frequency (e.g., one packet per 10 ms). Based on at least the received output data (W_5G, W_4G) from the trained RNN model, the splitter may select amongst the 5G and 4G legs, for each incoming PDCP PDU, one path (i.e., 5G leg or 4G leg) via which the corresponding PDCP PDU may be transmitted to reach the UE.

In an example embodiment, a database may be created at any time (e.g., periodically, at a given time, etc.) during the online inference phase of the trained ML model (e.g., of the trained DNN, C-DNN or RNN model), by collecting and storing over time information about the data of the input data set (e.g., data in flight and throughput, as depicted in the example embodiment of FIG. 10) for each path and the measured delay of transmission for the selected path via which a corresponding PDU has been transmitted.

During the collection time interval, a predetermined condition, based on, for example, a size of the collected information or a delay estimation error computed at the PDCP layer of the CU of the master node using the collected information, may be verified and may thereby lead to trigger a further offline training phase of the trained ML model with the aim of optimizing the performance of the trained ML model to cause the delays of transmission (i.e., W_5G, W_4G) to be estimated with an enhanced accuracy.

In an example case, the predetermined condition may be verified when the size of the information collected over time becomes equal to or higher than a predetermined size threshold value.

In another example case, the predetermined condition may be verified when the delay estimation error, which is computed based on a comparison, for each selected path, between the estimated delay of transmission output from the trained ML model inputting the collected input data set and the corresponding collected measured delay of transmission, is equal to or higher than a predetermined error threshold value.

Figure 11:
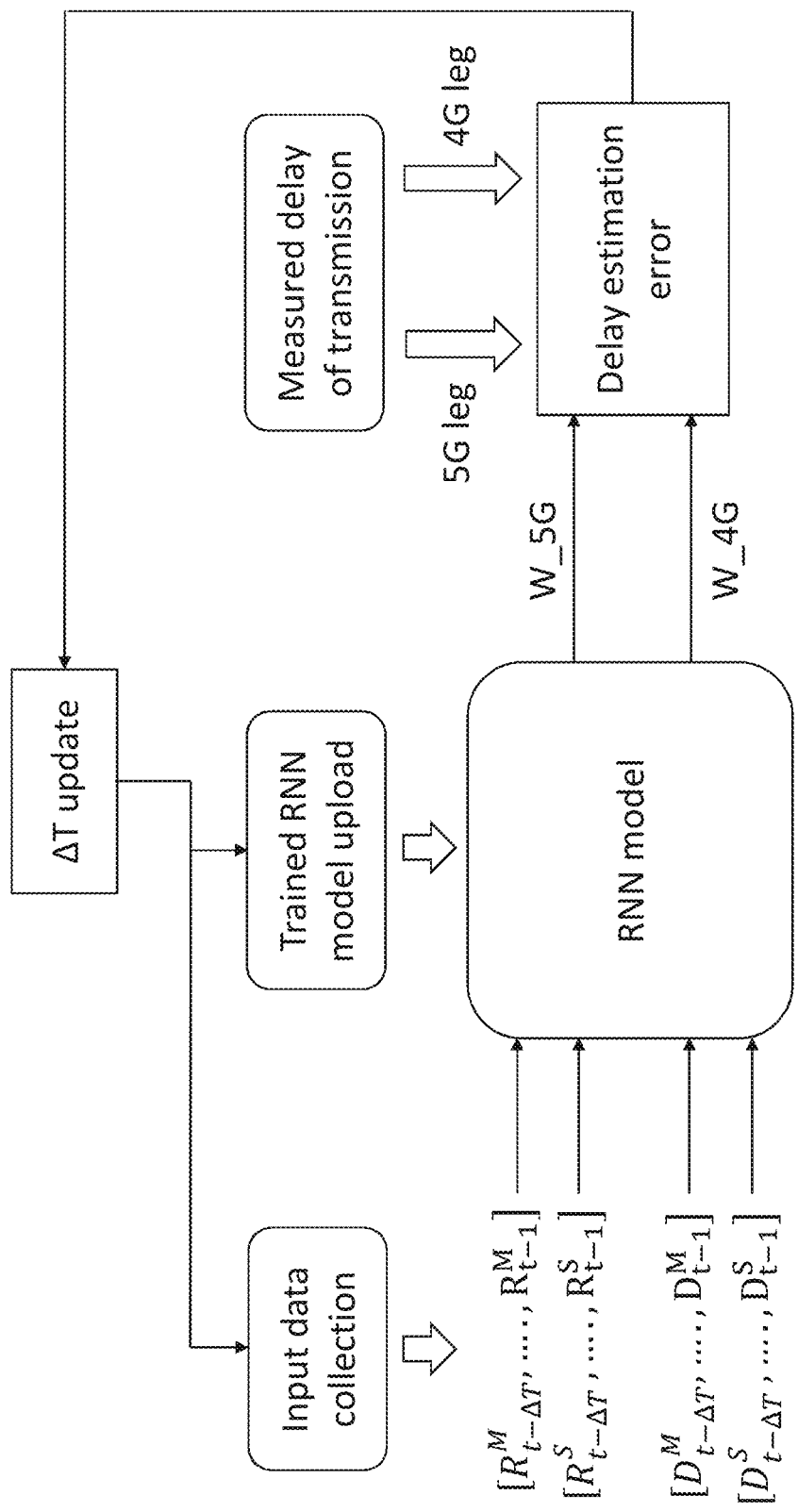
FIG. 11 shows an example embodiment of a closed loop optimization for a trained RNN model.

FIG. 11 shows an example embodiment of a closed loop optimization for the trained RNN model.

In the example case of the trained RNN model of FIG. 10, when the predetermined condition is verified that the computed delay estimation error is equal to or higher than the predetermined error threshold value, the predefined time interval ΔT, during which the input data set is recurrently collected, may be optionally updated in a closed loop fashion as shown in FIG. 11, still with the aim of optimizing the performance of the trained ML model to cause the delays of transmission (i.e., W_5G, W_4G) to be estimated with an enhanced accuracy.

As shown, the update of the predefined time interval ΔT may lead to the update of the input data per leg (5G, 4G) of the trained RNN model that was collected during the predefined time interval ΔT.

Moreover, for each ML model, there may be corresponding weights and bias that differ as function of the predefined time interval ΔT such that each time interval may correspond to a respective trained RNN model. For this reason, as shown, the update of the predefined time interval ΔT may require the upload of that trained RNN model corresponding to the updated predefined time interval.

In an example embodiment, the selection of the new time interval for the update of the time interval ΔT may be performed using a look up table (LUT) associated with a dedicated database to provide the corresponding time interval values as function of the computed delay estimation error values.

In another example embodiment, the selection of the new time interval for the update of the time interval ΔT may be performed using a NN or an ANN, each trained for inferring time interval values from the computed delay estimation error values.

Figure 12:
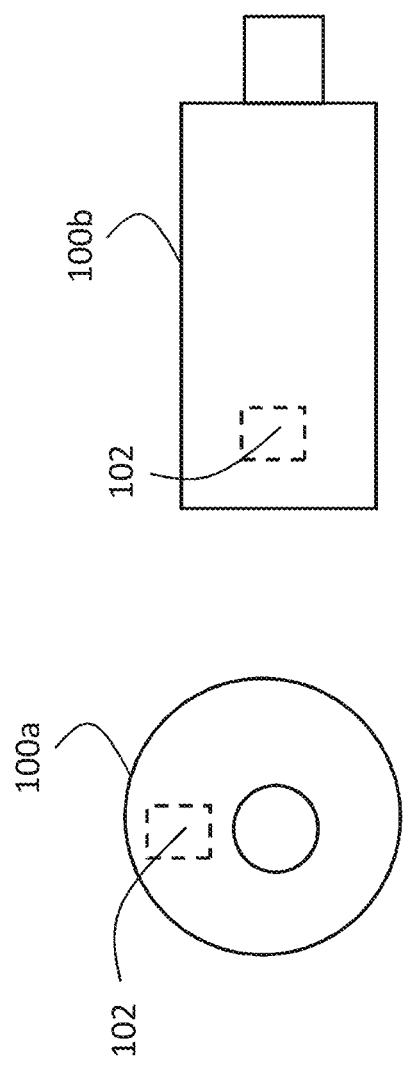
FIG. 12 shows an example embodiment of non-transitory computer readable media.

FIG. 12 shows an example embodiment of non-transitory computer readable media 100a (e.g., a computer disc (CD) or a digital versatile disc (DVD)) and 100b (e.g., an universal serial bus (USB) memory stick), which are configured to store instructions and/or parameters 102 that, when executed by a processor, allow the processor to perform one or more of the steps of any of the methods of any of the embodiments.

Figure 13:
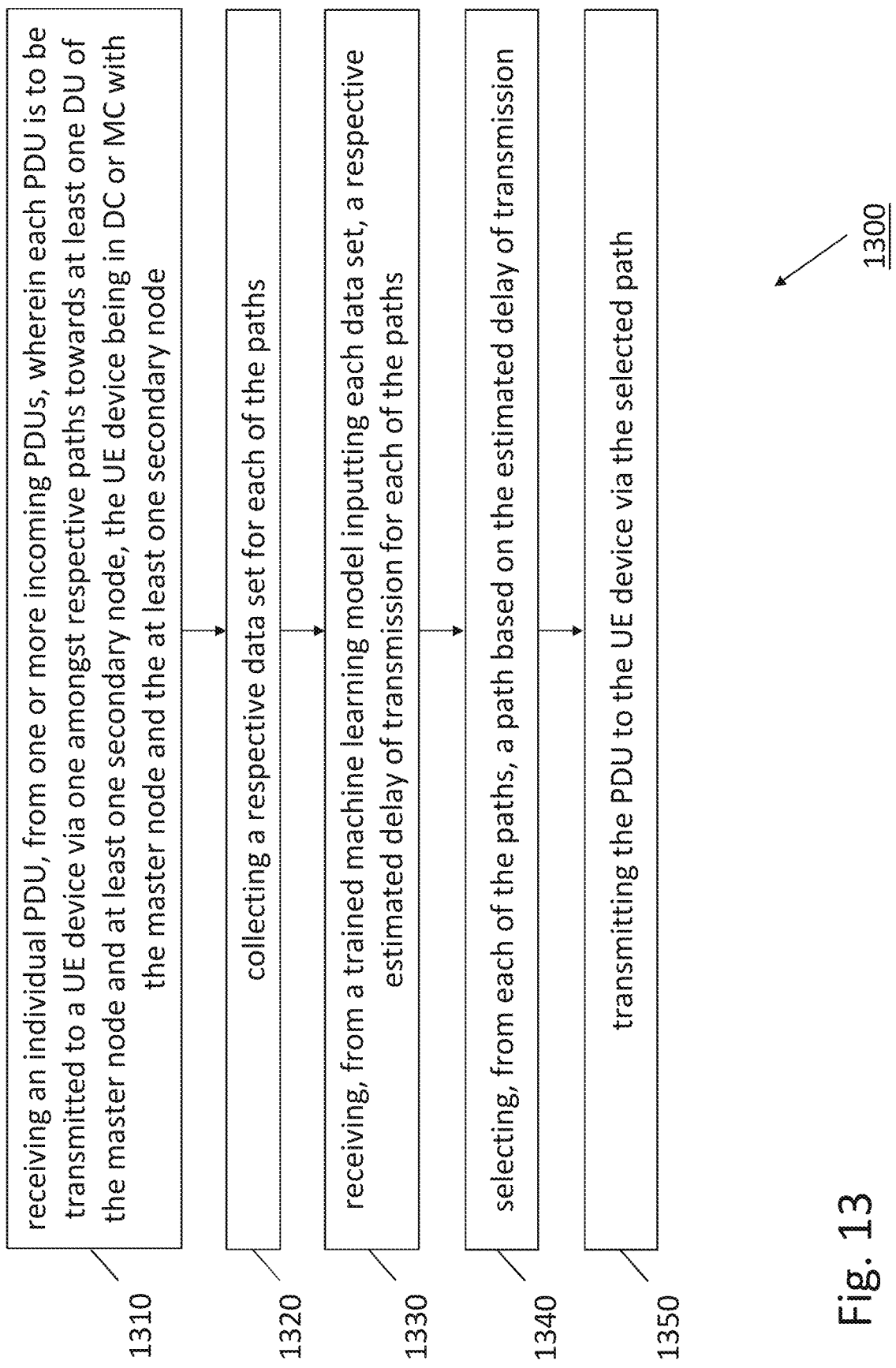
FIG. 13 shows an example flowchart describing an example embodiment of a ML-based procedure of routing a PDCP PDU via a selected path.

FIG. 13 shows an example flowchart 1300 describing an example embodiment of a ML-based procedure of routing a PDCP PDU via a selected path. This example flowchart 1300 may be implemented in the CU of the master node of FIG. 5, in particular in the PDCP layer of the CU, e.g., at splitter level, or in the apparatus 200 (see FIG. 16) provided in the PDCP layer.

In step 1310, the method of the example flowchart 1300 may comprise receiving an individual PDU, from one or more incoming PDUs, wherein each PDU is to be transmitted to a UE device via one amongst respective paths towards at least one DU of the master node and at least one secondary node, the UE device being in dual or multi-connectivity with the master node and the at least one secondary node.

In step 1320, the method of the example flowchart 1300 may comprise collecting a respective data set for each of the paths.

In step 1330, the method of the example flowchart 1300 may comprise receiving, from a trained machine learning model inputting each data set, a respective estimated delay of transmission for each of the paths.

In step 1340, the method of the example flowchart 1300 may comprise selecting, from each of the paths, a path based on the estimated delay of transmission.

In step 1350, the method of the example flowchart 1300 may comprise transmitting the PDU to the UE device via the selected path.

For the purpose of simulation, FIG. 14 shows an example embodiment of creation of a dataset by means of a simulation tool. The dataset, which has been used for the training of a concatenation-based DNN (C-DNN) model such as the C-DNN model of FIG. 9, comprises a set of input data (e.g., data in flight and expected throughput) and a set of measured delays of transmission. Parameters used for the simulation are as follows:

UE connected in NSA mode and supporting dual connectivity to a master MgNB and a secondary SeNB;
file transfer protocol (FTP) traffic in loop;
eNB 1 Celli (SeNB): 20 MHz and eNB 2 Celli (MgNB): 20 MHz;
RLC PDU size: 9600 bytes;
Initial throughput: 10 Mbps;
frequency of DDDS message: 10 ms;
splitter decision: approximately every ms for every incoming PDCP PDU.

The C-DNN model comprises two individual DNN models, each having two hidden layers with 64 nodes per layer and two dense layers after concatenation with 512 nodes, for a total number of 338434 trainable parameters.

For both MgNB and SeNB, the created set of input data for the concatenation-based DNN model is shown in tabular form in FIG. 14(a) for the data in flight and in FIG. 14(b) for the expected throughput. The set of input data is expressed in bytes per second, and each data in flight has been reported every ms, while each expected throughput has been reported every 10 ms inside the DDDS message. While the frequency of reporting of expected throughputs has been limited to one report every 10 ms in accordance with the frequency of DDDS messages, the same reported throughput has been considered for all intermediate values within this time period of 10 ms.

For both MgNB and SeNB, the set of measured delays of transmission for the concatenation-based DNN model is shown in tabular form in FIG. 14(c). Each measured delay of transmission is expressed in ms and has been reported every ms to the PDCP layer of the CU of MgNB through F1 interface for a delay of transmission measured at MAC layer of the DU of MgNB and through X2 interface for a delay of transmission measured at MAC layer of SeNB.

The C-DNN model has been trained using a dataset of 670000 samples of data in flight and expected throughputs as input features along with their corresponding measured delays of transmission.

Since the expected throughputs have been reported every 10 ms through F1 and X2 interfaces and the incoming PDCP PDU frequency of about 1 ms per PDU is higher, the same reported value of expected throughput has been taken for all incoming PDUs within the time period of 10 ms until a new expected throughput has been reported.

The simulation results for estimating the delays of transmission are given in statistical form (i.e., mean error, standard deviation and NRMSD/NRMSE (normalized root mean square deviation/error) in the following Tables I and II for a reporting period of 10 ms per expected throughput:

TABLE I

Mean delay estimation error and deviations for the training dataset

| Mean delay estimation error (ms) | Standard deviation (%) | NRMSD (%) |
|---|---|---|
| 0.0163 | 0.656 | 0.0322 |

TABLE II

Mean delay estimation error and deviations for the test dataset

| Mean delay estimation error (ms) | Standard deviation (%) | NRMSD (%) |
|---|---|---|
| 0.0166 | 0.658 | 0.0319 |

Based on the above parameters, a more than 99% accuracy in the estimation (or prediction) of delays of transmission for 5G and 4G legs for any given PDCP PDU in test dataset has been obtained, with respect to the mean measured delay of transmission (i.e., 49.9 ms) of FIG. 14(c).

In an attempt to reduce the overhead on F1 and X2 interfaces, the reporting period per throughput can be increased, for example, from 10 to 20 ms.

In this regard, the ensuing simulation results for estimating the delays of transmission are given in statistical form (i.e., mean error, standard deviation and NRMSD/NRMSE (normalized root mean square deviation/error) in the following Tables III and IV for a reporting period of 20 ms per expected throughput:

TABLE III

Mean delay estimation error and deviations for the training dataset

| Mean delay estimation error (ms) | Standard deviation (%) | NRMSD (%) |
|---|---|---|
| 0.0215 | 0.959 | 0.0501 |

TABLE IV

Mean delay estimation error and deviations for the test dataset

| Mean delay estimation error (ms) | Standard deviation (%) | NRMSD (%) |
|---|---|---|
| 0.022 | 0.958 | 0.0512 |

Based on the above simulation parameters, still a more than 99% accuracy in the estimation (or prediction) of delays of transmission for 5G and 4G legs for any given PDCP PDU in test dataset has been obtained, with respect to the mean measured delay of transmission (i.e., 49.9 ms) of FIG. 14(c). Although a bit higher values of standard deviation (i.e., 0.958%) and NRMSD (i.e., 0.0512%) have been unsurprisingly obtained, they however remain within an acceptable range.

This may thus prove that the proposed example implementation of a ML model trained for estimating a delay of transmission per path, may provide not only an accurate estimation in delays of transmission but may also be helpful in reducing and/or balancing overheads on F1 and X2 interfaces.

In comparison, the delays of transmission measured using the above mathematical formulation based on Little's law, have yielded a mean delay estimation error rate of up to 20%.

Figure 15:
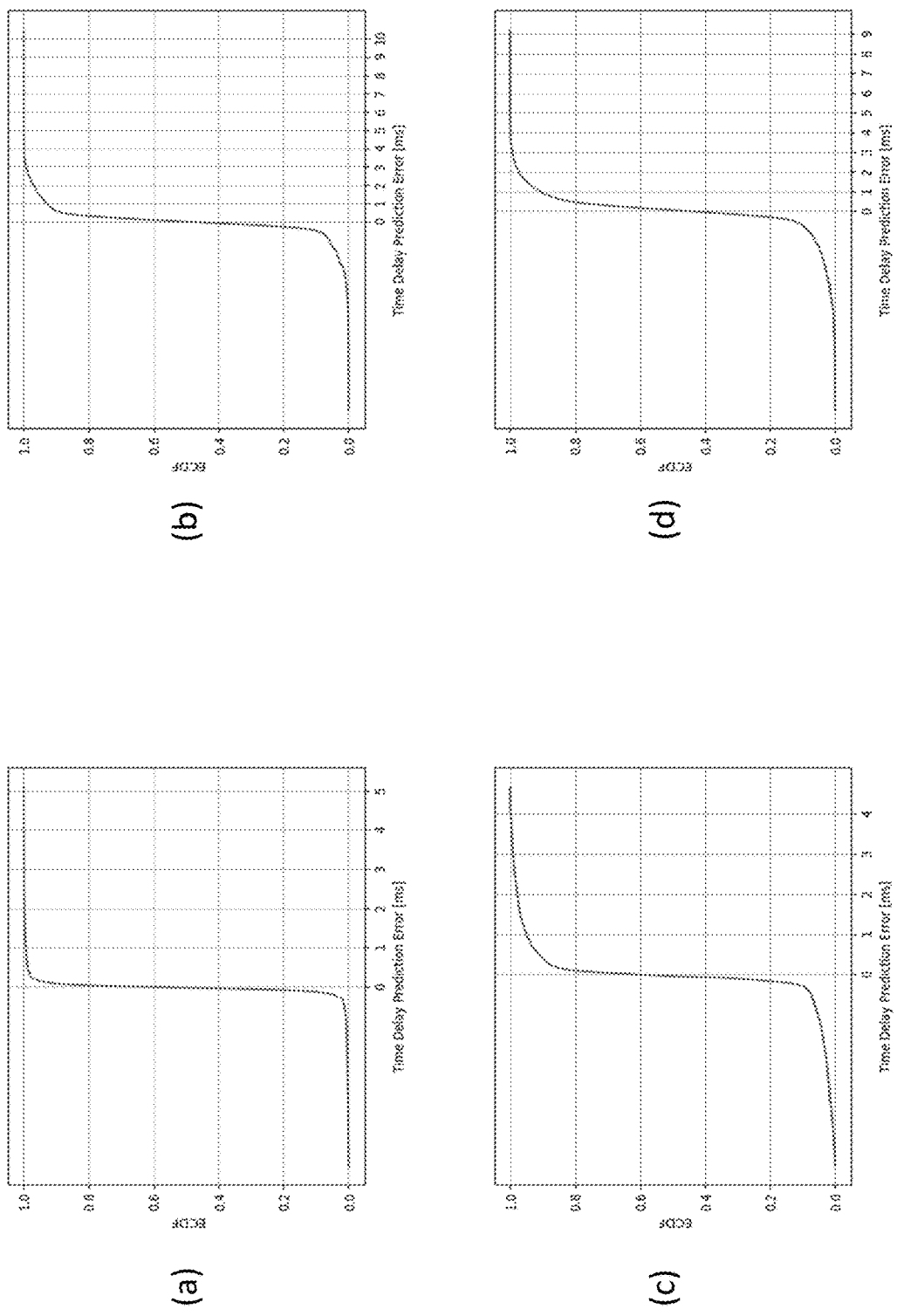
FIG. 15 shows an example embodiment of an empirical cumulative distribution function for the test dataset plotted against a time delay prediction error.

Based on the above simulation parameters, FIG. 15 shows an example embodiment of an empirical cumulative distribution function (ECDF) for the test dataset plotted against a time delay prediction error (in ms), in the case of: (a) a reporting period of 10 ms per expected throughput for 5G leg; (b) a reporting period of 10 ms per expected throughput for 4G leg; (c) a reporting period of 20 ms per expected throughput via 5G leg; (d) a reporting period of 20 ms per expected throughput via 4G leg.

Using the teachings of FIGS. 15(a)(b) for a reporting period of 10 ms per expected throughput, the delay error for 5G leg is less than 1 ms in more than 98% of the cases and the delay error for 4G leg is less than 1 ms in more than 94% of the cases.

Using the teachings of FIGS. 15(c)(d) for a reporting period of 20 ms per expected throughput, the delay error for 5G leg is less than 1 ms for more than 96% of the cases and the delay error for 4G leg is less than 1 ms for more than 90% of the cases.

With respect to the mean measured delay of transmission (i.e., 49.9 ms) of FIG. 14(c), it means that an error of 1 ms shows an accuracy of around 98%.

It should be appreciated that, while the above has described some example embodiments, there are several variations and modifications which may be made to the disclosed solution without departing from the scope of the present application. For instance, although the example embodiment of FIG. 5 refers to two legs or paths in the example case where there are one CU of the master node, one DU of the master node and one secondary node, example variants may refer to more than two legs or paths in the example cases where there are: (i) one CU, multiple DUs and one secondary node, (ii) one CU, one DU and multiple secondary nodes, or (iii) one CU, multiple DUs and multiple secondary nodes. The number of legs or paths may then correspond to the number of DUs of the master node and secondary nodes connected to the CU of the master node. In another instance, although the example embodiment of FIG. 5 refers to one UE, example variants may refer to multiple UEs in dual or multi-connectivity with the above arrangement of master and secondary nodes.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

Figure 16:
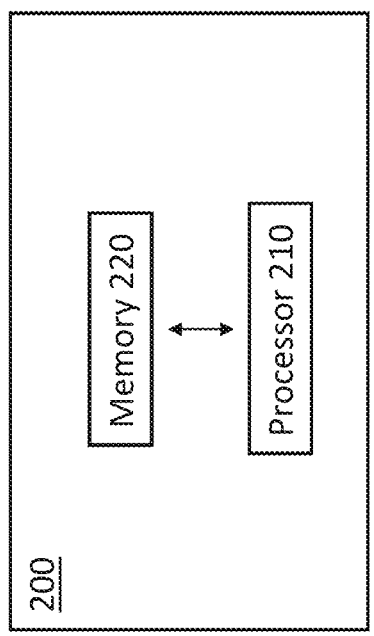
FIG. 16 shows an example embodiment of an apparatus.

FIG. 16 shows an example embodiment of an apparatus 200, which may be provided in the CU of the master node (gNB-CU), in particular in the PDCP layer of the CU, e.g., at splitter level. The apparatus 200 may comprise at least one processor 210 and at least one memory 220 including computer code for one or more programs. The apparatus 200 may be configured to cause one or more of the steps of any of the methods of any of the embodiments to be performed.

Alternatively or additionally, some embodiments may be implemented using circuitry. The circuitry may be configured to perform one or more of the functions and/or method steps previously described. That circuitry may be provided, for example, in the CU of the master node (gNB-CU) of FIG. 5, in particular in the PDCP layer of the CU, e.g., at splitter level, or in the apparatus 200 provided in the PDCP layer.

As used in the present application, the term "circuitry" may refer to one or more or all of the following:
(a) hardware-only circuit implementations (such as implementations in only analogue and/or digital circuitry);
(b) combinations of hardware circuits and software, such as:
 (i) a combination of analogue and/or digital hardware circuit(s) with software/firmware and
 (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example, integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus comprising:
at least one processor; and
at least one non-transitory memory storing instructions that, when executed by the at least one processor, cause the apparatus to at least perform at a central unit of a master node:
receiving an individual packet data unit from one or more incoming packet data units, wherein each packet data unit is to be transmitted to a user equipment device via one amongst respective paths towards at least one distributed unit of the master node and at least one secondary node, the user equipment device being in dual or multi-connectivity with the master node and the at least one secondary node;
collecting a respective data set for each of the paths;
receiving, from a machine learning model inputting each data set, at least one first estimated delay of transmission for at least one first path comprising the at least one distributed unit, and at least one second estimated delay of transmission for at least one second path comprising the at least one secondary node;
selecting, from each of the paths, a path based on at least the at least one first estimated delay of transmission for the at least one first path comprising the at least one distributed unit, and the at least one second estimated delay of transmission for the at least one second path comprising the at least one secondary node;
transmitting the packet data unit to the user equipment device via the selected path;
receiving a plurality of measured delays of transmission for the selected path at a first frequency;
obtaining network data for the selected path at a second frequency;
wherein the first frequency is higher than the second frequency; and
training the machine learning model at least partially using the plurality of measured delays of transmission and the network data;
wherein to train the machine learning model, at least some of the network data obtained at the second frequency is duplicated during a time interval to correspond to respectively different measured delays of transmission of the plurality of measured delays of transmission received at the first frequency.

2. The apparatus of claim 1, wherein the instructions, when executed by the at least one processor, cause the apparatus to perform at times, after transmitting the packet data unit (PDU) to the user equipment (UE) device via the selected path:

receiving, from one of the at least one distributed unit (DU) of the master node or one of the at least one secondary node depending on towards which the PDU has been transmitted via the selected path, a measured delay of transmission for the selected path.

3. The apparatus of claim 2, wherein the instructions, when executed by the at least one processor, cause the apparatus to perform:
collecting information about the data set for each of the paths and the measured delay of transmission for the selected path;
determining whether the collected information verifies a predetermined condition; and
triggering a training of the machine learning model when the predetermined condition is verified.

4. The apparatus of claim 3, wherein the predetermined condition, that when verified triggers the training of the machine learning model, comprises at least one of:
a size of the collected information is equal to or higher than a predetermined size threshold value; or
a delay estimation error is equal to or higher than a predetermined error threshold value, the delay estimation error being computed based on a comparison, for the selected path, between the estimated delay of transmission and the measured delay of transmission.

5. The apparatus of claim 4, wherein the instructions, when executed by the at least one processor, cause the apparatus to perform, when the machine learning model comprises a recurrent neural network (RNN) model:
updating, when the delay estimation error is equal to or higher than the predetermined error threshold value, a time interval during which the data set is recurrently collected; and
uploading the machine learning model that is associated with the updated time interval.

6. The apparatus of claim 3, wherein the measured delay of transmission for the selected path is received during a time period at least whenever the training of the machine learning model is triggered, the training of the machine learning model comprising:
performing a correspondence between the data set input in the machine learning model and the measured delay of transmission, for the selected path.

7. The apparatus of claim 2, wherein the measured delay of transmission is measured at a media access control layer of the at least one DU of the master node and the at least one secondary node, and received from each of the at least one DU of the master node via a respective F1 interface and from each of the at least one secondary node via a respective X2 interface.

8. The apparatus of claim 1, wherein the respective data set for each of the paths comprises a first data set for the at least one first path comprising the at least one distributed unit, and a second data set for the at least one second path comprising the at least one secondary node.

9. The apparatus of claim 8, wherein the first data set comprises at least: a number of packet data units in queue to be transmitted with the central unit of the master node with the at least one first path comprising the at least one distributed unit, and the second data set comprises at least a number of packet data units in queue to be transmitted with the central unit of the master node with the at least one second path comprising the at least one secondary node.

10. The apparatus of claim 8, wherein the first data set comprises at least throughput of the at least one first path comprising the at least one distributed unit, and the second data set comprises at least throughput of the at least one second path comprising the at least one secondary node.

11. The apparatus of claim 1, wherein the instructions, when executed by the at least one processor, cause the apparatus to:
train the machine learning model at least partially using a measured delay of transmission for the at least one first path comprising the at least one distributed unit, and a measured delay of transmission for the at least one second path comprising the at least one secondary node.

12. The apparatus of claim 1, wherein the instructions, when executed by the at least one processor, cause the apparatus to:
train the machine learning model at least partially using a number of packet data units in queue transmitted with the central unit of the master node with the at least one first path comprising the at least one distributed unit, and a number of packet data units in queue transmitted with the central unit of the master node with the at least one second path comprising the at least one secondary node.

13. The apparatus of claim 1, wherein the instructions, when executed by the at least one processor, cause the apparatus to:
train the machine learning model at least partially using measured throughput of the at least one first path comprising the at least one distributed unit, and measured throughput of the at least one second path comprising the at least one secondary node.

14. The apparatus of claim 1, wherein the respective data set for each of the paths comprises a first type of data and a second type of data, the machine learning model is split into at least a first machine learning model that receives as input the first type of data and a second machine learning model that receives as input the second type of data, and the machine learning model is configured to use a first output of the first machine learning model and a second output of the second machine learning model to generate the at least one first estimated delay of transmission for the at least one first path comprising the at least one distributed unit, and the at least one second estimated delay of transmission for the at least one second path comprising the at least one secondary node.

15. The apparatus of claim 1, wherein the master node is a network node of a first generation, and the at least one secondary node comprises a network node of a second generation, the second generation being different from the first generation.

16. The apparatus of claim 15, wherein the first generation is new radio (NR) or 5G, and the second generation is long term evolution (LTE) or 4G.

17. A method performed at a central unit of a master node, the method comprising:
receiving an individual packet data unit, from one or more incoming packet data units, wherein each packet data unit is to be transmitted to a user equipment device via one amongst respective paths towards at least one distributed unit of the master node and at least one secondary node, the user equipment device being in dual or multi-connectivity with the master node and the at least one secondary node;
collecting a respective data set for each of the paths;
receiving, from a machine learning model inputting each data set, a respective estimated delay of transmission for each of the paths;

selecting, from each of the paths, a path based on the estimated delay of transmission;
transmitting the packet data unit to the user equipment device via the selected path;
receiving a plurality of measured delays of transmission for the selected path at a first frequency;
obtaining network data for the selected path at a second frequency;
wherein the first frequency is higher than the second frequency; and
training the machine learning model at least partially using the plurality of measured delays of transmission and the network data;
wherein to train the machine learning model, at least some of the network data obtained at the second frequency is duplicated during a time interval to correspond to respectively different measured delays of transmission of the plurality of measured delays of transmission received at the first frequency.

18. The method of claim 17, further comprising, after transmitting the packet data unit (PDU) to the user equipment (UE) device via the selected path:
receiving, from one of the at least one distributed unit (DU) of the master node or one of the at least one secondary node depending on towards which the PDU has been transmitted via the selected path, at times, a measured delay of transmission for the selected path.

19. The method of claim 18, further comprising:
collecting information about the data set for each of the paths and the measured delay of transmission for the selected path;
determining whether the collected information verifies a predetermined condition; and
triggering a training of the machine learning model when the predetermined condition is verified.

20. The method of claim 19, wherein the predetermined condition, that when verified triggers the training of the machine learning model, comprises at least one of:
a size of the collected information is equal to or higher than a predetermined size threshold value; or
a delay estimation error is equal to or higher than a predetermined error threshold value, the delay estimation error being computed based on a comparison, for the selected path, between the estimated delay of transmission and the measured delay of transmission.

21. The method of claim 20, further comprising, when the machine learning model comprises a recurrent neural network (RNN) model:
updating, when the delay estimation error is equal to or higher than the predetermined error threshold value, a time interval during which the data set is recurrently collected; and
uploading the machine learning model that is associated with the updated time interval.

22. The method of claim 19, wherein the measured delay of transmission for the selected path is received during a time period at least whenever the training of the machine learning model is triggered, the training of the trained machine learning model comprising:
performing a correspondence between the data set input in the machine learning model and the measured delay of transmission, for the selected path.

23. The method of claim 18, wherein the measured delay of transmission is measured at a media access control layer of the at least one DU of the master node and the at least one secondary node, and received from each of the at least one DU of the master node via a respective F1 interface and from each of the at least one secondary node via a respective X2 interface.

24. A non-transitory computer readable medium comprising program instructions stored thereon for performing at a central unit of a master node, at least:
receiving an individual packet data unit, from one or more sequentially incoming packet data units, wherein each packet data unit is to be transmitted to a user equipment device via one amongst respective paths towards at least one distributed unit of the master node and at least one secondary node, the user equipment device being in dual or multi-connectivity with the master node and the at least one secondary node;
collecting a respective data set for each of the paths;
receiving, from a machine learning model inputting each data set, a respective estimated delay of transmission for each of the paths;
selecting, from each of the paths, a path based on the estimated delay of transmission;
transmitting the packet data unit to the user equipment device via the selected path;
receiving a plurality of measured delays of transmission for the selected path at a first frequency;
obtaining network data for the selected path at a second frequency;
wherein the first frequency is higher than the second frequency; and
training the machine learning model at least partially using the plurality of measured delays of transmission and the network data;
wherein to train the machine learning model, at least some of the network data obtained at the second frequency is duplicated during a time interval to correspond to respectively different measured delays of transmission of the plurality of measured delays of transmission received at the first frequency.

* * * * *